US006841894B2

(12) United States Patent
Gomez Gomar

(10) Patent No.: US 6,841,894 B2
(45) Date of Patent: Jan. 11, 2005

(54) WIND POWER GENERATOR HAVING WIND CHANNELING BODY WITH PROGRESSIVELY REDUCED SECTION

(76) Inventor: Josep Lluis Gomez Gomar, Major, 15 1° 1ª , 08783 Masquefa (ES)

( * ) Notice: Subject to any disclaimer, the term of this patent is extended or adjusted under 35 U.S.C. 154(b) by 27 days.

(21) Appl. No.: 10/335,839

(22) Filed: Jan. 2, 2003

(65) Prior Publication Data

US 2004/0130161 A1 Jul. 8, 2004

(51) Int. Cl.[7] .............................. H02P 9/00; H02P 9/04; F03D 9/00; F03D 9/02; F03D 3/02

(52) U.S. Cl. ........................................................ 290/55
(58) Field of Search .................................... 290/55

(56) References Cited

U.S. PATENT DOCUMENTS

| 3,883,261 | A | * | 5/1975 | Saxmann ........................ 415/7 |
| 3,883,750 | A | * | 5/1975 | Uzzell, Jr. ..................... 290/55 |
| 3,920,354 | A | * | 11/1975 | Decker ........................ 416/117 |
| 3,970,409 | A | * | 7/1976 | Luchuk ....................... 416/145 |
| 3,988,072 | A | * | 10/1976 | Sellman ....................... 415/2.1 |
| 4,017,204 | A | * | 4/1977 | Sellman ....................... 415/4.4 |
| 4,052,134 | A | * | 10/1977 | Rumsey ....................... 416/119 |
| 4,084,918 | A | * | 4/1978 | Pavlecka ....................... 415/1 |
| 4,086,498 | A | * | 4/1978 | Szoeke ........................ 290/55 |
| 4,134,710 | A | * | 1/1979 | Atherton ..................... 416/117 |
| 4,164,382 | A | * | 8/1979 | Mysels ........................ 415/4.4 |
| 4,177,009 | A | * | 12/1979 | Baum et al. .................. 416/45 |
| 4,186,314 | A | * | 1/1980 | Diggs ........................... 290/55 |
| 4,208,168 | A | * | 6/1980 | Chen et al. ............. 416/132 B |
| 4,209,281 | A | * | 6/1980 | Edmunds ................ 416/197 A |
| 4,220,870 | A | * | 9/1980 | Kelly ........................... 290/44 |
| 4,278,896 | A | * | 7/1981 | McFarland ................... 290/55 |
| 4,292,540 | A | * | 9/1981 | Thompson et al. ........... 290/55 |
| 4,303,835 | A | * | 12/1981 | Bair ............................. 290/55 |
| 4,318,019 | A | * | 3/1982 | Teasley et al. ......... 310/156.35 |
| 4,365,929 | A | * | 12/1982 | Retz ........................... 415/53.1 |
| 4,383,801 | A | * | 5/1983 | Pryor .......................... 416/17 |
| 4,414,477 | A | * | 11/1983 | Mewburn-Crook et al. ... 290/55 |
| 4,508,973 | A | * | 4/1985 | Payne .......................... 290/55 |
| 4,516,907 | A | * | 5/1985 | Edwards ...................... 415/4.5 |
| 4,551,631 | A | * | 11/1985 | Trigilio ........................ 290/55 |
| 4,609,827 | A | * | 9/1986 | Nepple ........................ 290/44 |
| 4,735,382 | A | * | 4/1988 | Pinson ........................ 244/150 |
| 4,792,700 | A | * | 12/1988 | Ammons ...................... 290/55 |
| 4,834,610 | A | * | 5/1989 | Bond, III ................... 415/53.3 |
| 4,890,976 | A | * | 1/1990 | Jansson ........................ 415/4.4 |
| 5,038,049 | A | * | 8/1991 | Kato ............................ 290/55 |
| 5,044,878 | A | * | 9/1991 | Wilhelm ..................... 415/4.2 |
| 5,133,637 | A | * | 7/1992 | Wadsworth ................. 415/4.4 |
| 5,391,926 | A | * | 2/1995 | Staley et al. ................. 290/55 |
| 5,454,694 | A | * | 10/1995 | O'Dell ..................... 416/197 A |
| 5,518,362 | A | * | 5/1996 | Kivilammi ................... 415/2.1 |
| 5,553,996 | A | * | 9/1996 | Farrar ......................... 415/2.1 |

(List continued on next page.)

FOREIGN PATENT DOCUMENTS

| DE | 3129660 A1 | * | 2/1983 | ............ F03D/3/06 |
| EP | 957265 A2 | * | 11/1999 | ............ F03D/3/04 |
| ES | 554984 | | 5/1986 | |
| ES | 2 107 324 | | 11/1997 | |

Primary Examiner—Nicholas Ponomarenko
Assistant Examiner—Pedro J. Cuevas
(74) Attorney, Agent, or Firm—Michael J. Striker

(57) ABSTRACT

A wind power recovery device has a tower, a rotor arranged on the tower and including a plurality of blades rotatable under the action of wind, the rotor also having an axis for transmitting the rotation of the rotor to another apparatus, a wind channeling body provided with a series of walls which form channelings with a section which is progressively reduced from an entry side of the wind channeling body to an exit side of the channeling body toward the rotor to affect tangentially the blades of the rotor at a speed higher than at the entry side of the body, the wind channeling body having a side face, and a blind protecting the side face of the channeling body.

13 Claims, 4 Drawing Sheets

U.S. PATENT DOCUMENTS

| | | | | |
|---|---|---|---|---|
| 5,591,004 | A | * | 1/1997 | Aylor ............................ 416/42 |
| 5,632,599 | A | * | 5/1997 | Townsend ..................... 416/42 |
| 5,664,418 | A | * | 9/1997 | Walters ......................... 60/398 |
| 5,743,712 | A | * | 4/1998 | Aylor ............................ 416/42 |
| 5,850,108 | A | * | 12/1998 | Bernard ........................ 290/54 |
| 6,015,258 | A | * | 1/2000 | Taylor ......................... 415/4.4 |
| 6,191,496 | B1 | * | 2/2001 | Elder ............................ 290/55 |
| 6,242,818 | B1 | * | 6/2001 | Smedley ....................... 290/44 |
| 6,249,059 | B1 | * | 6/2001 | Hosoda ......................... 290/55 |
| 6,448,668 | B1 | * | 9/2002 | Robitaille ..................... 290/54 |
| 6,448,669 | B1 | * | 9/2002 | Elder ............................ 290/54 |
| 6,465,899 | B2 | * | 10/2002 | Roberts ........................ 290/44 |
| 6,518,680 | B2 | * | 2/2003 | McDavid, Jr. ................ 290/54 |
| 6,538,340 | B2 | * | 3/2003 | Elder ............................ 290/55 |
| 6,674,181 | B2 | * | 1/2004 | Harbison ...................... 290/55 |
| 6,710,469 | B2 | * | 3/2004 | McDavid, Jr. ................ 290/55 |

* cited by examiner

WIND POWER GENERATOR HAVING WIND CHANNELING BODY WITH PROGRESSIVELY REDUCED SECTION

TECHNICAL FIELD

The present invention relates to a wind power generator having a wind channeling body with a progressively reduced section.

BACKGROUND OF THE INVENTION

In relation to prior art, currently existing devices that are used to recover wind power and transform it into mechanical or electrical energy can be classified, according to its axis position, as horizontal axis or vertical axis, suffering both types from several disadvantages, sufficiently overcame by the improvements of the present patent.

As is known, today's horizontal axis devices stand in general at a considerable height and are located in very high areas and almost always in the very parting planes of mountain slopes, mountain ranges or massifs, with the consequent undesired visual impact. They can also cause severe damage to wildlife, especially to flying species, due to their large blades. These negative factors are determinant for the installation of wind power plants nowadays, versus ecologist requirements. Improvements in the present patent enable to build devices with high wind power recovery, low height and not harmful to flying species.

Today's horizontal and vertical axis devices also produce a characteristic noise when the assembly blades are turning, which can become serious when considering the installation of a wind power plant with a large number of power devices. The mentioned improvements achieve a less noisy device, and therefore no noise pollution of the environment is produced when several of these devices are installed in a specific area.

The fact that periodic wind regimes differ according to place, time of day, seasons, meteorology at a given moment and topography of the site must be taken into account when deciding the location of today's wind power recovery devices. However, the features of the device to which the improvements of the present invention apply enable to place it, without any difficulty or performance reduction, in areas with high or low wind speed, and regardless of the wind direction.

The improvements of the present invention enable to reduce the main drawbacks of vertical axis wind turbines, such as mechanical fatigue and the presence of natural resonance frequencies, as well as the fact that rotation coupling presents variations in every cycle. Another additional problem of vertical axis devices, and also reduced with the incorporation of the present improvements, is that they require motorization in order to overcome the high breakaway torque.

Patent No. P 9300316 "Wind Turbo Generator" presents a large hopper applied to a horizontal axis wind turbine so that it is also used with low speed winds, but due to such large hopper produces a significant visual and sound impact.

Patent No. P 055984 "System to enhance the performance of a vertical axis aerogenerator" produces also an important visual impact due to the fact that it stands taller than the devices of the mentioned improvements, and has a lower performance.

SUMMARY OF THE INVENTION

The improvements referenced by the present invention consist of incorporating to a reinforced concrete structure a series of internally located wind power recovery devices, comprising such structure a vertical axis body with a series of channelings and adjustable blinds especially arranged and suitably located in the device, being such body located at the top of a tower of a relatively low height and also preferably made up of reinforced concrete.

This device enables optimum use of wind energy, since it recovers and channels wind-force appropriately, enabling the provision of electrical energy by means of an electrical generator or of mechanical energy by means of direct application to a gearbox, enabling to operate miscellaneous mechanisms relating to agriculture, industry, as well as other social and urban applications.

Therefore, the purpose of the present invention is to enable the use of wind power in a beneficial and profitable way, even with a very low wind strength according to the Beaufort scale.

In addition, this use is performed in a markedly environmental-friendly way, since the wind power recovery of the improvements introduced is clean, quiet and with a high machine performance.

BRIEF DESCRIPTION OF THE DRAWINGS

With the purpose to describe the different components of the improvements object of the present invention, there are attached a series of drawings, as non-limitative examples, which represent a practical embodiment thereof.

In said drawings.

DETAILED DESCRIPTION OF THE INVENTION

Figure 1:
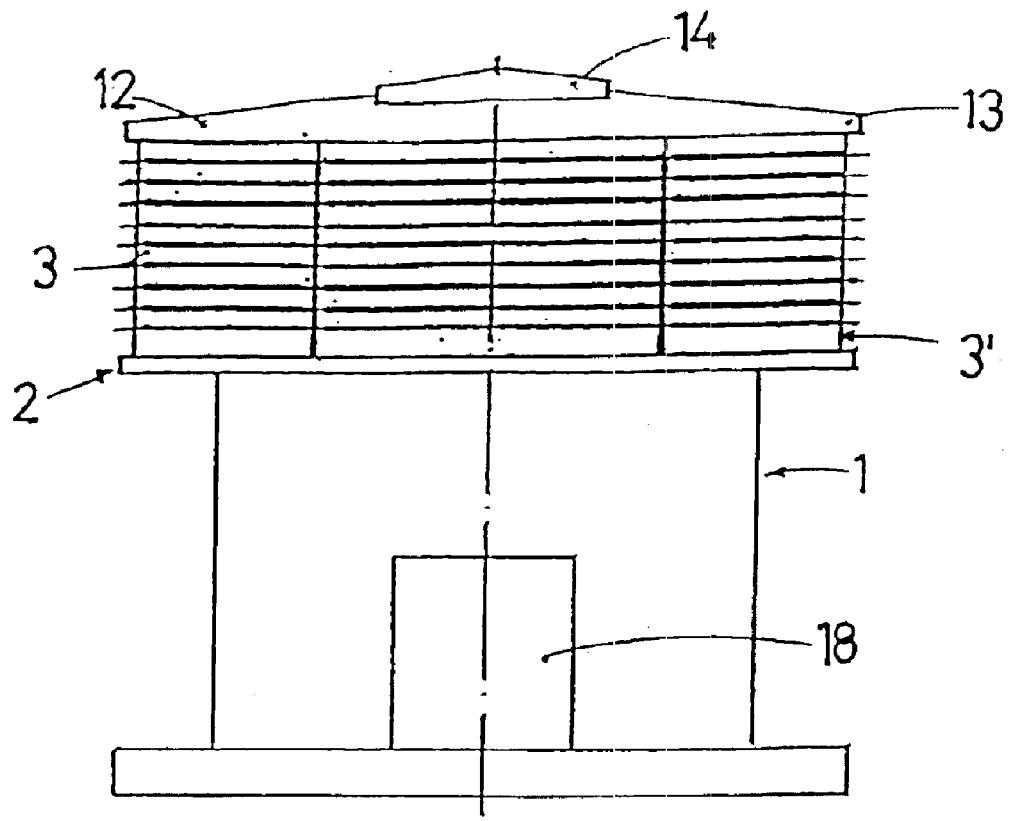
FIG. 1 is an external elevation view of one of the devices that include the improvements of the present patent.

According to the drawings, the improvements introduced in the vertical axis wind power recovery devices comprise a reinforced concrete tower (1) on top of which there is located a wind channeling body (2) that has an open side face but delimited in its entire contour by adjustable blinds (3).

The wind channeling body (2) is umbrella-shaped and has a circular or polygonal plan as shown in FIGS. 3 to 7, with a surface area larger than the tower surface (1) and with a body height (2) standing, preferably, around 2.5 and 3 meters (8.2–10 ft).

The practical embodiment of said improvements shows, in principle, three alternatives according to the height that can reach the structure formed by the tower (1) and the wind channeling body (2).

A first alternative, with a structure between 10 and 15 meters in height, determined by the site where it will be installed and by the wind recovery expected.

A second alternative would be a structure between 5 and 10 meters in height, according to the same factors previously mentioned.

And finally a third alternative, under 5 meters in height, for direct installation on the roofs of factory premises, dwellings and even over water supply basins, for example.

According to the above description, the optimum working layer for models between 5 and 15 meters in height includes wind speeds between 5 and 21 m/s (18 and 75.6 km/h), achieving an outstanding performance. These wind conditions are found preferably in coastal areas, as well as in valleys and plateaus.

As for the lower height model, optimum performance is achieved between wind speeds of 4 to 8 m/s (14.4 and 28.8 km/h), high-low values that usually occur in cities and open inland areas.

The inside of the above-mentioned wind channeling body (2) has thin walls of reinforced concrete (4), which provide channelings (5), as can be seen in FIGS. 3 to 7, so that the wind coming from outside is guided towards a vertical axis rotor (6) perfectly centered in the wind channeling body (2), such rotor incorporating usually 5, 6 or 8 blades (7). The special layout of the channelings (5) enables the wind to affect tangentially said blades (7), therefore contributing to the rotation of said rotor (6). As they move closer to the rotor (6), the channelings (5) offer a continuous reduction in their section so that the admission area (8) has a surface larger than the exit section of the channeling (9). This section reduction forces an increase in the speed of the wind recovered in the admission area (8). The layout of these admission areas (8) along the perimeter of the body (2) enables to recover wind regardless of the direction thereof.

Considering the above-mentioned wind speed factors, reference should be made to the fact that an admission area surface (8) of, for example, 15 m$^2$ enables to recover around 60 m$^3$ of air per second, which being forced to exit through the channeling exit (9) with a section of 4 m$^2$, produces a considerable speed increase of approximately 3.75, so that the wind affects the blades (7) with a pressure above 70 kgm/s$^2$, causing the rotation of the rotor (6) between 1.5 and 1.7 rps., once the windage loss is deducted.

Figure 2:
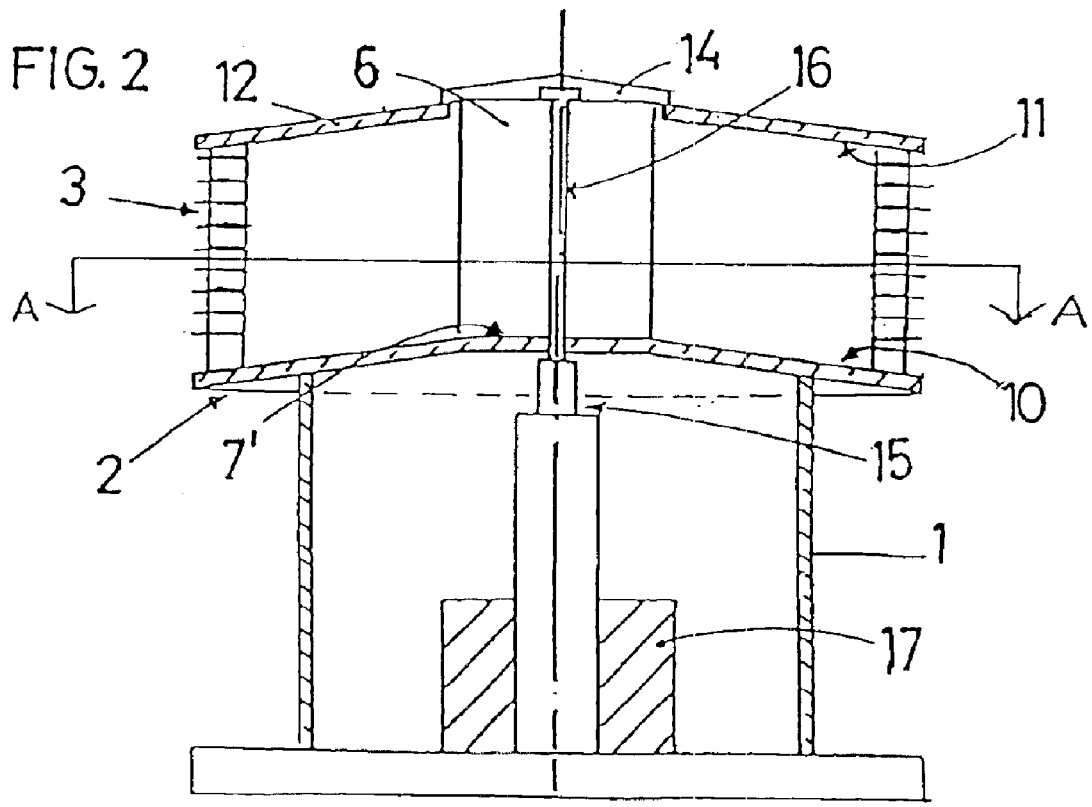
FIG. 2 is a view of the devices, according to the previous figure, sectioned by its axial plane, which shows the layout of the different elements that include the improvements of the invention.
Figure 3:
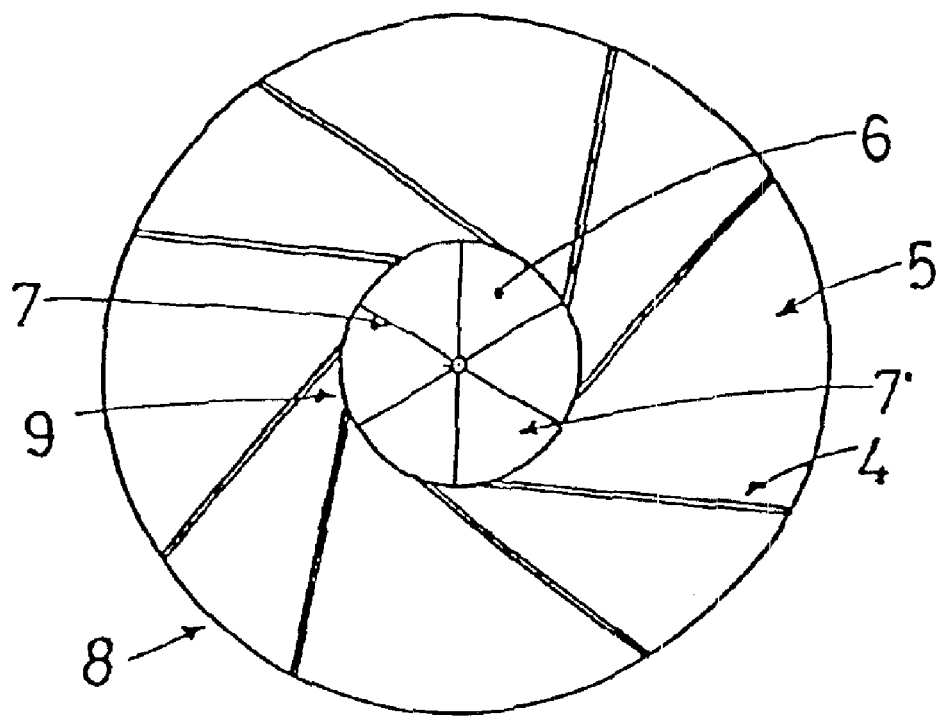
FIG. 3 is a view sectioned by the AA plane, of the previous figure, in a circular contour embodiment.
Figure 4:
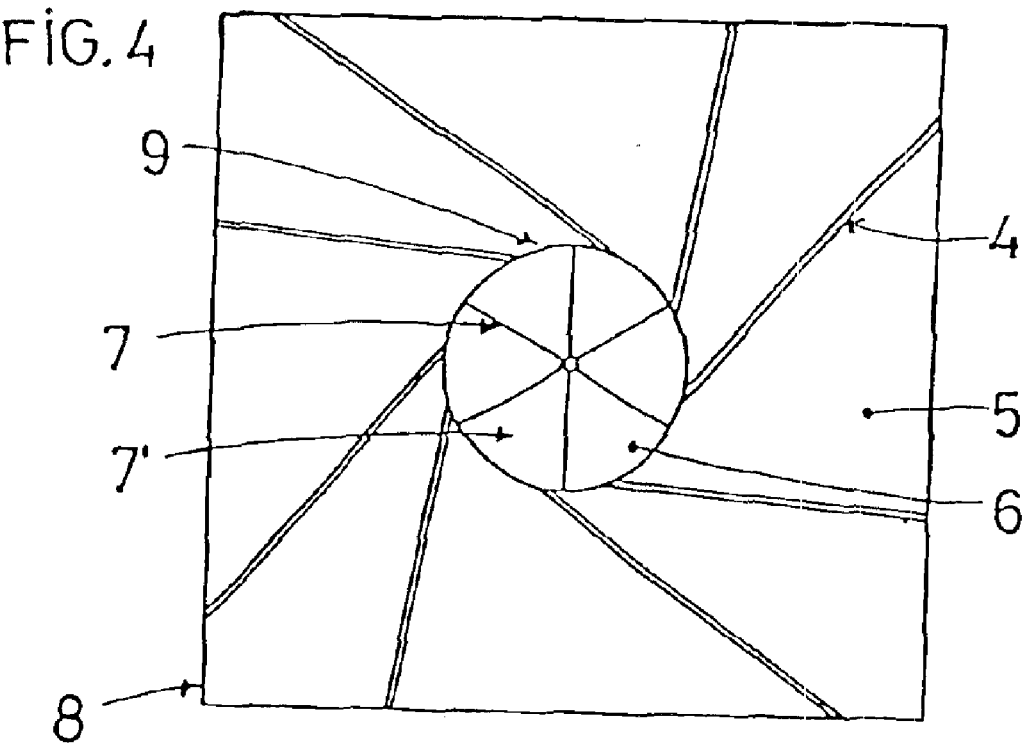
FIG. 4 is a section similar to the previous figure, but in a quadrangular contour embodiment.
Figure 5:
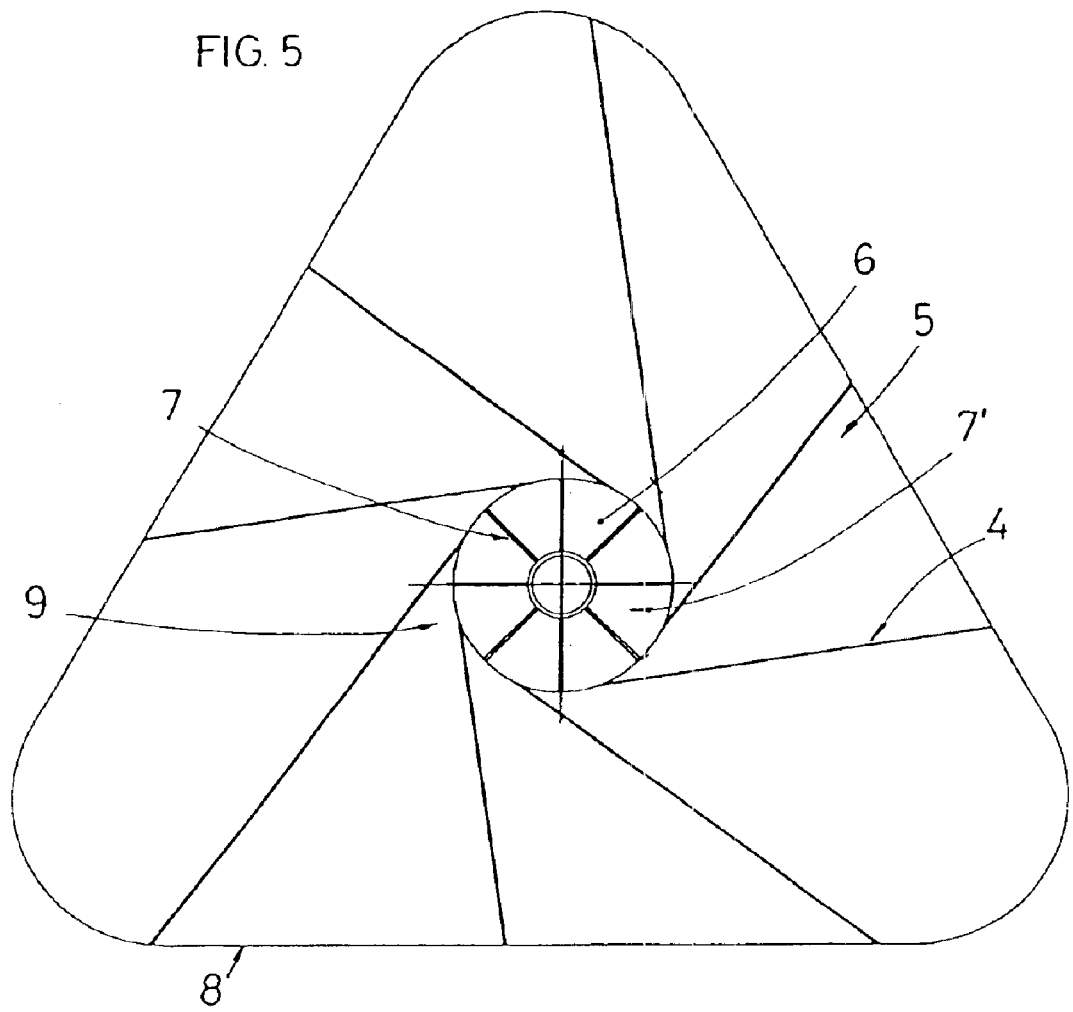
FIG. 5 is a section similar to FIGS. 3 and 4, in a triangular contour embodiment.
Figure 6:
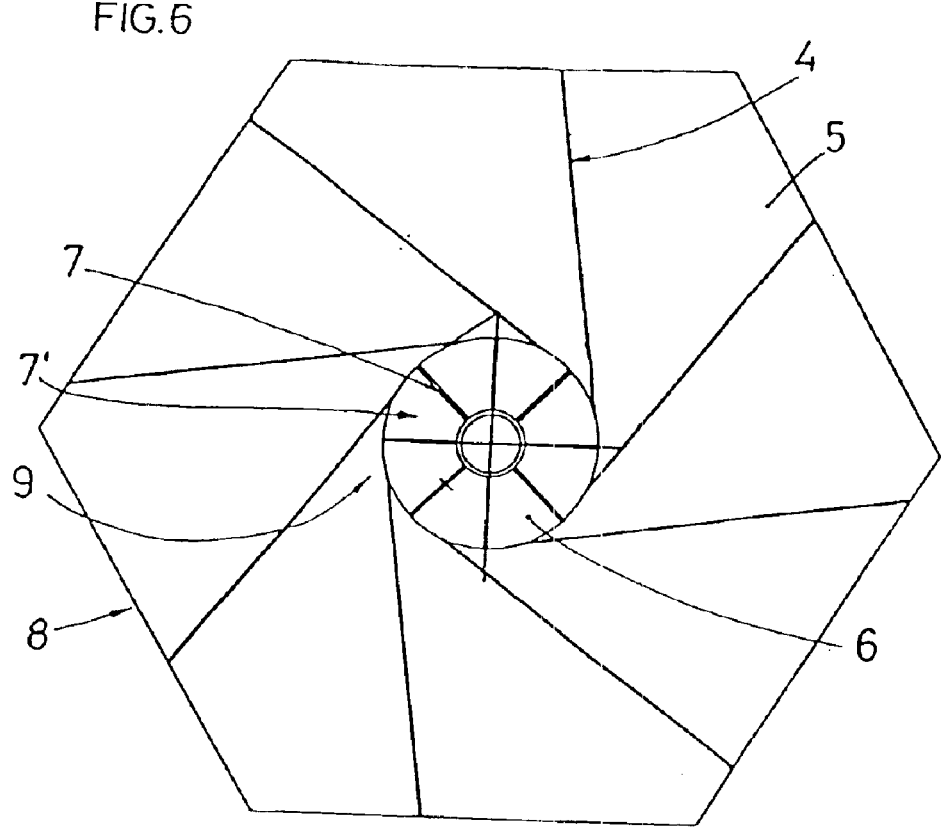
FIG. 6 is also a section similar to the three previous figures, in another hexagonal contour embodiment; and finally.
Figure 7:
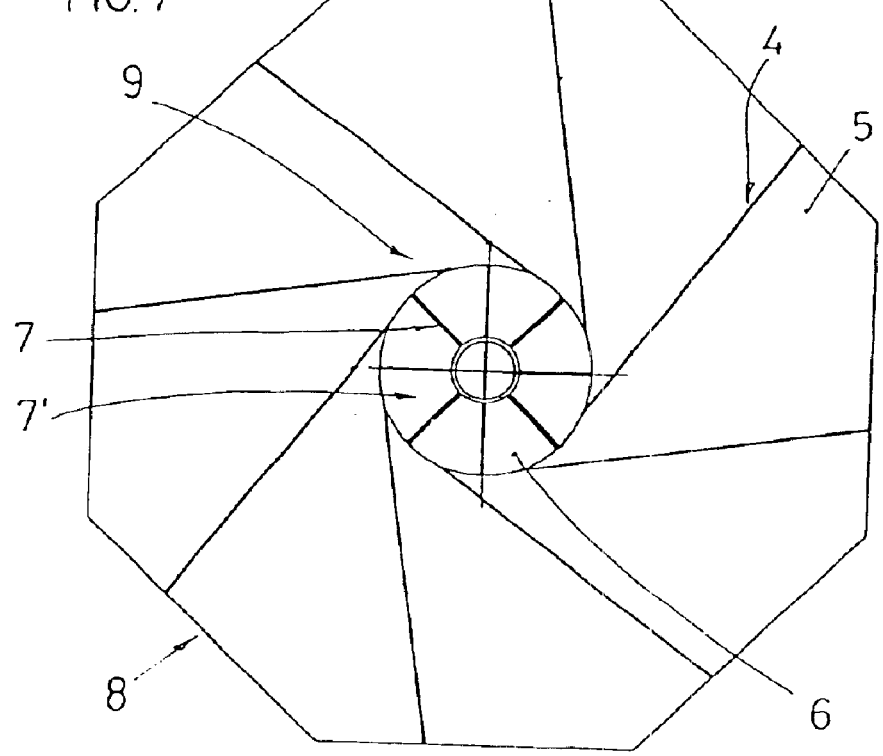
FIG. 7 is a section similar to the four previous figures, but in another octagonal contour embodiment.

As can be noticed in FIG. 2, both the ground (10) and the roof (11) of the inside of the wind channeling body (2) are not horizontal, but rather slightly bent towards the rotor area (6), with the purpose of reducing the exit section of the channeling (9) and therefore increasing the wind speed affecting the blades (7).

The foreign bodies passing through the slits of the blinds (3) exit from the wind channeling body (2) due to their own weight thanks to the mentioned inclination of the ground (10) and to the fact that said blind (3) does not close completely in its lower part (3'), as is shown in FIGS. 1 and 2. In addition, this special layout enables a better recovery of low speed winds produced at the end of strong wind gusts.

The mentioned wind channeling body (2) is protected by an umbrella-shaped cover (12), provided with a sharp perimeter projection (13), with the purpose of protecting the blinds (3) from outdoor elements such as snow and water. The cover (12) is provided with a transparent upper central area or cap (14) that allows sunrays to pass towards the rotor (6), thus warming up the edges of the blades (7) and of the flat bottom (7'), which is properly polished. This warming produces an increase in the temperature of the wind located there and the consequent displacement towards the upper part of the rotor (6), starting automatically an air flow from the outside of the device towards the mentioned rotor (6). In this way, there can be obtained a reduction in the high breakaway torque of vertical axis wind power recovery devices.

The rotor (6) is coupled to a step-up gearbox (15) by means of the axis (16). The step-up gearbox (15), properly oil cooled and of the planetary gear, electronic and automatic kind, obtains that an electrical generator (17) rotates at rated speed and delivers a power of the order of 300 kW. In turn, said generator (17) is preferably cooled with water or glycol. In another layout, not represented in the drawings, the step-up gearbox (15) operates miscellaneous mechanisms relating to agriculture, industrial plants or other social and urban applications.

All the processes can be controlled by means of a microprocessor, controlled preferably by satellite, thus provided with a series of sensors for vibration, meteorological control, such as anemometers, wind vanes and thermometers, speed, temperature and hydraulic, among others, which basically control the different operating situations of the rotor (6), axis (16), generator (17), step-up gearbox (15) and brakes.

This control system also enables to operate the adjustable blinds (3) so that they can change their aperture appropriately. In addition, said adjustable blinds (3) prevent foreign bodies, such as branches or others, from passing through and causing damage to the blades (7) of the rotor (6). A door (18) enables personnel to access the concrete tower (1) essentially for maintenance and cleaning purposes.

While the main characteristics of the improvements applied to the wind power recovery devices, object of the present invention, have been sufficiently described, it should be mentioned that any changes made during the practical implementation, affecting dimensions, non essential shapes, appearance and external finishing, as well as the type of materials used, in no event shall alter the main aspects of the invention, which is summarized in the following claims.

What is claimed is:

1. A wind power recovery device, comprising:
    a tower;
    a rotor arranged on said tower and including a plurality of blades rotatable under the action of wind, said rotor also having an axis for transmitting the rotation of said rotor to another apparatus;
    a wind channeling body provided with series of walls which form channelings with, all sections being progressively reduced from an entry side of said wind channeling body to an exit side of said channeling body toward said rotor to affect tangentially said blades of said rotor at a speed higher than at said entry side of said body, said wind channeling body having a side face; and a blind protecting said side face of said channeling body.

2. A wind power recovery device as defined in claim 1; and further comprising a step-up gear box connected with said axis for transmitting the rotation of said axis to another apparatus.

3. A wind power recovery device as defined in claim 1, wherein said axis of said rotor is connectable to a further apparatus formed as an electric generator.

4. A wind power recovery device as defined in claim 1, wherein said axis is formed so as to transmit a rotation of said rotor to a further apparatus formed as a mechanical mechanism.

5. A wind power recovery device as defined in claim 1, wherein said wind channeling body is composed of reinforced concrete.

6. A wind power recovery device as defined in claim 1, wherein said wind channeling body has a section selected from the group consisting of a circular section and a polygonal section.

7. A wind power recovery device as defined in claim 1, wherein said walls of said channeling body are straight walls.

8. A wind power recovery device as defined in claim 1, wherein said walls of said channeling body are arranged at an oblique angle.

9. A wind power recovery device as defined in claim 1, wherein said tower is composed of reinforced concrete.

10. A wind power recovery device as defined in claim 1, wherein said blind is formed as an adjustable metallic blind.

11. A wind power recovery device as defined in claim 1, wherein said wind channeling body at said entry side has wind admission areas of said channelings arranged around a whole perimeter of said wind channeling body so that said rotor rotates always regardless of a direction of wind, said channeling body having a ground and a roof which are bent toward an inside in order to increase a speed of wind on said blades of said rotor.

12. A wind power recovery device as defined in claim 1, wherein said wind channeling body has a perimeter projection and a band cover formed as an umbrella except in a central area of said wind channeling body; and a transparent cover provided in said central area of said wind channeling body and allowing sun rays to pass through toward said rotor, said blades having edges and said rotor having a flat bottom which are polished so as to affect said sun rays.

13. A wind power recovery device as defined in claim 1, wherein said blind has a plurality of adjustable blind elements which change their aperture automatically through electronic means according to the speed of wind, said blinds being formed so as not to close completely their lower part which corresponds to a ground of said wind channeling body.

* * * * *